(12) United States Patent
Tsai et al.

(10) Patent No.: US 8,520,084 B2
(45) Date of Patent: Aug. 27, 2013

(54) VIDEO STABILIZATION SYSTEM AND METHOD

(75) Inventors: Tsung-Han Tsai, Taoyuan County (TW); Chih-Lun Fang, Yilan County (TW)

(73) Assignee: National Central University, Taoyuan County (TW)

( * ) Notice: Subject to any disclaimer, the term of this patent is extended or adjusted under 35 U.S.C. 154(b) by 42 days.

(21) Appl. No.: 13/430,720

(22) Filed: Mar. 27, 2012

(65) Prior Publication Data

US 2013/0100303 A1   Apr. 25, 2013

(30) Foreign Application Priority Data

Oct. 24, 2011   (TW) .............................. 100138541 A

(51) Int. Cl.
*H04N 5/228*   (2006.01)

(52) U.S. Cl.
USPC ..................................... 348/208.4; 348/222.1

(58) Field of Classification Search
USPC .......................................... 348/208.1, 222.1
See application file for complete search history.

(56) References Cited

U.S. PATENT DOCUMENTS

| | | | |
|---|---|---|---|
| 5,748,231 A | 5/1998 | Park et al. | |
| 7,315,325 B2 | 1/2008 | Soupliotis et al. | |
| 2010/0157072 A1* | 6/2010 | Luo et al. | 348/208.4 |
| 2011/0103480 A1* | 5/2011 | Dane | 375/240.16 |
| 2011/0243383 A1* | 10/2011 | Oyaizu | 382/103 |

FOREIGN PATENT DOCUMENTS

| | | |
|---|---|---|
| TW | I253002 | 4/2006 |
| TW | 200840343 | 10/2008 |
| TW | 200937946 | 9/2009 |
| TW | 201023632 | 6/2010 |

OTHER PUBLICATIONS

J. Yang, D. Schonfeld, C. Chen, and M. Mohamed, "Online video stabilization based on particle filters," in Proc. of the IEEE Int'l Conf. on Image Processing, 2006.

Z. Juanjuan and G. Baolong, "Electronic image stabilization based on global feature tracking," Journal of Systems Engineering and Electronics, vol. 19, No. 2, pp. 228-233, 2008.

(Continued)

*Primary Examiner* — Gevell Selby
(74) *Attorney, Agent, or Firm* — CKC & Partners Co., Ltd.

(57) ABSTRACT

A video stabilization method includes detecting a plurality of feature points of an inputted image frame. Next, a block motion estimation is performed onto the inputted image frame according to the feature points, thereby generating a plurality of block motion vectors corresponding to the feature points. Then, the block motion vectors are converted to a histogram to perform a statistical process. Thereafter, an initial static background motion vector is determined according to a statistic value of the histogram. Thereafter, a Gaussian distribution model and a Maximum a Posteriori (MAP) estimation are adopted to correct the initial static background motion vector to generate a global motion vector. Then, a smoothing process is performed onto the global motion vector to generate a smoothed global motion vector. A video stabilization system is also provided here.

10 Claims, 4 Drawing Sheets

(56) References Cited

OTHER PUBLICATIONS

H. C. Chang, S. H. Lai, and K. R. Lu, "A robust real-time video stabilization algorithm," Journal of Visual Communication & Image Representation, vol. 17, No. 3, pp. 659-673, Jun. 2006.

H. H. Chen, C. K. Liang, Y. C. Peng, and H. A. Chang, "Integration of digital stabilizer with video codec for digital video cameras," IEEE Trans. Circuits and Syst. for Video Tech., vol. 17, No. 7, p.

A. Bosco, A. Bruna, S. Battiato, G. Bella, and G. Pluglisi, "Digital video stabilization through curve warping techniques," IEEE Trans. Consumer Electronics, vol. 54, No. 2, pp. 220-224, May 2008.

S. Battiato, A. R. Bruna, and G. Puglisi, "A Robust Block-Based Image/Video Registration Approach for Mobile Imaging Devices," IEEE Trans. on Multimedia, vol. 12, No. 7, Nov. 2010.(7).

* cited by examiner

VIDEO STABILIZATION SYSTEM AND METHOD

RELATED APPLICATIONS

This application claims priority to Taiwan Application Serial Number 100138541, filed Oct. 24, 2011, which is herein incorporated by reference.

BACKGROUND

1. Technical Field

The present disclosure relates to a video device and a video processing method, and more particularly, to a video stabilization system and a video stabilization system method.

2. Description of Related Art

With the development of electronic technologies, the popularity of digital filming devices grows increasingly, and hence, most of the current mobile electronic devices are equipped with a digital filming function. However, the aforementioned mobile electronic devices mostly are hand held for filming, and image vibration often occurs in the filmed video due to the unstable hand-held state, thus resulting in visual discomfort while viewing the filmed video.

For the purpose of improving image vibration suppression, a method of estimating block motion vectors and a global motion vector is proposed in the prior art to correct image frames with image vibration. However, in the prior art, a processor may be overloaded due to high computation quantity, and when computing and processing tremendous objects or complex pictures, it may cause erroneous judgment of the global motion vector, so that the image frames with image vibration cannot be corrected correctly in real time.

Hence, the prior art still has the abovementioned disadvantages and inadequacy need to be solved.

SUMMARY

An aspect of the present disclosure is to provide a video stabilization system, comprising a block motion estimation unit, a global motion estimation unit and a smoothing unit. The block motion estimation unit detects a plurality of feature points of an inputted image frame and performs a block motion estimation onto the inputted image frame by using the feature points as reference points, thereby generating a plurality of block motion vectors corresponding to the feature points. The global motion estimation unit is electrically coupled to the block motion estimation unit for performing a histogram statistic onto the block motion vectors so as to determine an initial static background motion vector, and for correcting the initial static background motion vector by adopting a Gaussian distribution model and a Maximum a Posteriori (MAP) estimation to generate a global motion vector. The smoothing unit is electrically coupled to the global motion estimation unit for performing a smoothing process onto the global motion vector to generate a smoothed global motion vector.

According to one embodiment of the present disclosure, the video stabilization system further comprises an image correcting unit. The image correcting unit is electrically coupled to the smoothing unit for performing image correcting onto the inputted image frame according to the smoothed global motion vector, thereby generating a stabilized image.

Another aspect of the present disclosure is to provide a video stabilization method including detecting a plurality of feature points of an inputted image frame. Then, a block motion estimation is performed onto the inputted image frame according to the feature points, thereby generating a plurality of block motion vectors corresponding to the feature points. Thereafter, the block motion vectors are converted to a histogram to perform a statistical process. Then, an initial static background motion vector is determined according to a statistic value of the histogram. Thereafter, the initial static background motion vector is corrected by adopting a Gaussian distribution model and a Maximum a Posteriori (MAP) estimation to generate a global motion vector. Then, a smoothing process is performed onto the global motion vector to generate a smoothed global motion vector.

According to one embodiment of the present disclosure, the step of determining the initial static background motion vector comprises: dividing the histogram into two groups through a two-valued approach. Then, two intervals with the highest accumulative times of motion strength of the block motion vectors are selected from the groups. Thereafter, motion direction variances of the intervals are calculated. Then, one of the intervals with the smaller motion direction variance is selected as motion strength of the initial static background motion vector.

According to one embodiment of the present disclosure, the two-valued approach is used to divide the block motion vectors into a low motion strength group and a high motion strength group according to a motion strength critical value.

According to one embodiment of the present disclosure, the Gaussian distribution model is used to decide whether motion directions of the block motion vectors corresponding to specific intervals of the histogram conform to a Gaussian distribution probability so as to correct the initial static background motion vector, and the Gaussian distribution model is represented by the following formula:

$$\rho = N(\theta_i | \overline{\theta}_i, 0)$$

where $\rho$ is a probability of the block motion vectors conforming to Gaussian distribution; N is the Gaussian distribution; $\theta_i$ is motion directions of the block motion vectors in the $i^{th}$ correction; and $\overline{\theta}_i$ is an average value of the motion directions of the block motion vectors in the $i^{th}$ correction.

According to one embodiment of the present disclosure, the Maximum a Posteriori (MAP) estimation is used to correct the initial static background motion vector according to the block motion vectors corresponding to intervals around the initial static background motion vector in the histogram, and the Maximum a Posteriori (MAP) estimation is represented by the following formula:

$$\omega' = (1-\alpha)\omega + \alpha x$$

where $\omega'$ is a new numerical value of the motion vector; $\alpha$ is a coefficient; $\omega$ is an old numerical value of the motion vector; and x is a Posteriori probability.

According to one embodiment of the present disclosure, the coefficient $\alpha$ is defined as a reciprocal $\sigma^{-1}$ of the motion direction variance, and the Posteriori probability x is defined as motion vectors including motion strength and motion directions, and the global motion vector after the correction is represented by the following formulas:

$$S_u = (1-\sigma^{-1})S_{i-1} + \sigma^{-1}\overline{I}_i,$$

$$A_i = (1-\sigma^{-1})A_{i-1} + \sigma^{-1}\overline{\theta}_i$$

$$i = \{I_0+1, I_0-1, I_0+2, I_0-2, \ldots\}$$

where $S_i$ is motion strength of the global motion vector after the correction; $A_i$ is a motion direction of the global motion vector after the correction; i is an index value of the intervals in the histogram; $\sigma^{-1}$ is the reciprocal of the motion direction variance; $\overline{I}_i$ is an average value of motion strength of the global motion vector in the $i^{th}$ correction; and $\bar{\theta}_i$ is an average value of motion directions of the global motion vector in the $i^{th}$ correction.

According to one embodiment of the present disclosure, the global motion vector corresponds to motion energy, and the motion energy is represented by the following formulas:

$$E = \int (E_{continue} + E_{curve}) dt$$

$$E_{continue} = \left\| \frac{dc(t)}{dt} \right\| = \|p_j - p_{j-1}\|^2$$

$$E_{curve} = \left\| \frac{d^2 c(t)}{dt^2} \right\| = \|(p_{j+1} - p_j) - (p_j - p_{j-1})\|^2$$

$$P_j = (MVx, MVy)$$

where E is the motion energy; $E_{continue}$ is continuous energy; $E_{curve}$ is curve energy; $P_i$ is the accumulative global motion vector of a $j^{th}$ image frame; MVx is an x-axis global motion vector; and MVy is a y-axis global motion vector.

According to one embodiment of the present disclosure, the smoothed global motion vector is represented by the following formula:

$$SG = \left( \sum_{j=-1\ldots-3} G'_j \cdot |E'_j| + \sum_{j=0\ldots 2} G_j \cdot |E_j| \right) / \left( \sum_{j=-1\ldots-3} |E'_j| + \sum_{j=0\ldots 2} |E_j| \right)$$

where $G_j'$ is the smoothed global motion vector in the $j^{th}$ image frame; $G_j$ is the original global motion vector in the $j^{th}$ image frame; $E_j'$ is the smoothed motion energy in the $j^{th}$ image frame; and $E_j$ is the original motion energy in the $j^{th}$ image frame.

Hence, according to the technical contents of the embodiments of the present disclosure, the computation quantity of image processing is effectively reduced and the global motion vector of the inputted image frame is precisely estimated via the block motion estimation of the feature points and the estimation of the static background motion vector, so that the present disclosure is applicable to image vibration-proof processing of large objects and complex pictures.

BRIEF DESCRIPTION OF THE DRAWINGS

In order to make the aforementioned and other objectives, features, advantages and embodiments of the present disclosure more comprehensible, the accompanying drawings are illustrated as follows.

DETAILED DESCRIPTION

The spirit of the present disclosure is illustrated clearly below with reference to drawings and detailed description, persons having ordinary skill in the art, after understanding exemplary embodiments of the present disclosure, may make changes and modifications through technologies taught in the present disclosure, and the changes and modifications do not depart from the spirit and the scope of the present disclosure.

Figure 1:
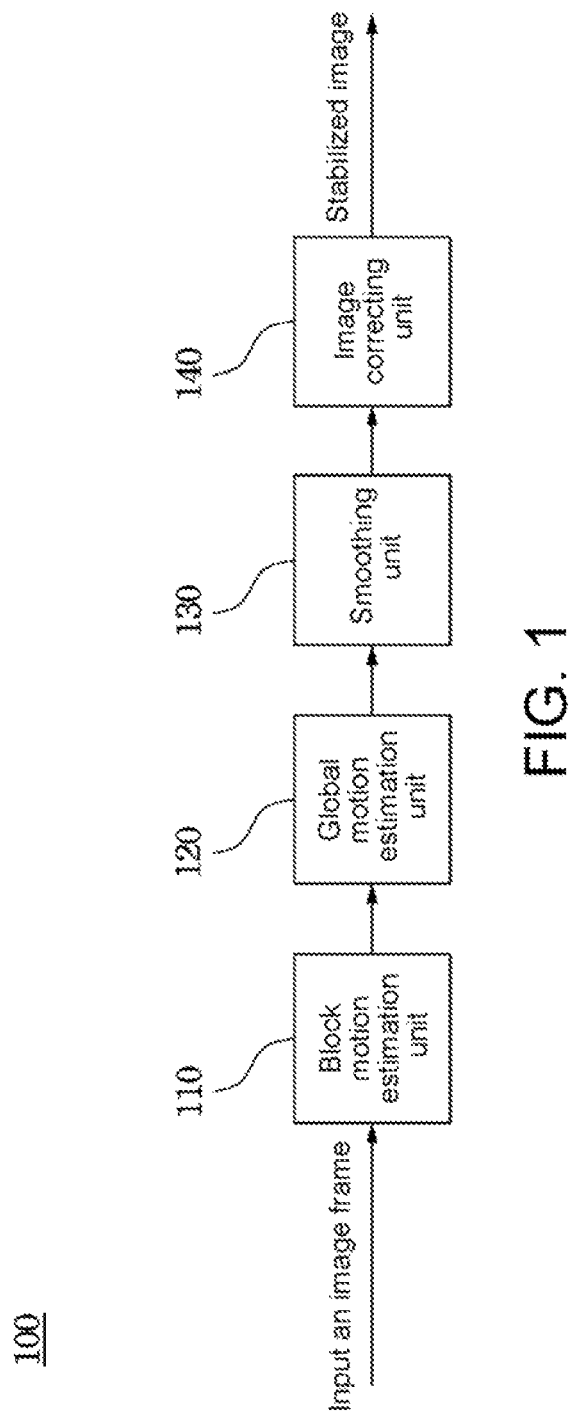
FIG. 1 is a schematic block diagram showing a circuit structure of a video stabilization system according to one embodiment of the present disclosure.

FIG. 1 is a schematic block diagram showing a circuit structure of a video stabilization system 100 according to one embodiment of the present disclosure. The video stabilization system 100 may comprise a block motion estimation unit 110, a global motion estimation unit 120 and a smoothing unit 130. The block motion estimation unit 100 is used to detect a plurality of feature points of an inputted image frame, and to perform a block motion estimation onto the inputted image frame by using the feature points as reference points, thereby generating a plurality of block motion vectors corresponding to the feature points. The global motion estimation unit 120 is electrically coupled to the block motion estimation unit 110 for converting the block motion vectors to a histogram to perform a statistical process so as to determine an initial static background motion vector, and for correcting the initial static background motion vector by adopting a Gaussian distribution model and a Maximum a Posteriori (MAP) estimation to generate a global motion vector. The smoothing unit 130 is electrically coupled to the global motion estimation unit 120 for performing a smoothing process onto the global motion vector to generate a smoothed global motion vector.

It should be noted that the size of the image block is adjustable while the block motion estimation unit 110 performs a block motion estimation. For example, the size is 16*16 pixels or 64*64 pixels.

In one embodiment of the present disclosure, the video stabilization system 100 may further comprise an image correcting unit 140. The image correcting unit 140 is electrically coupled to the smoothing unit 130 for performing image correcting onto the inputted image frame according to the smoothed global motion vector to generate a stabilized image.

For example, when correction is required as a vibration phenomenon occurring in the filmed image is detected, the block motion estimation unit 100 is used to detect the position of the feature points of the inputted image frame, and to set the feature points as reference points for performing comparison between the blocks of the inputted image frame and the former image frame so as to estimate the block motion vectors. Then, the global motion estimation unit 120 determines the initial static background motion vector through a statistic value of the histogram of the block motion vectors. Thereafter, the global motion estimation unit 120 adopts a Gaussian distribution model and a Maximum a Posteriori (MAP) estimation to calculate the motion direction of the initial static background motion vector to estimate image displacement, and to correct the initial static background motion vector to generate a global motion vector. Then, the smoothing unit 130 calculates motion energy of the continuous image frames according to image frames adjacent to the inputted image frame. Thereafter, the smoothing unit 130 adopts motion energy of image frames adjacent to the inputted image frame as a weighted value for calculating the smoothed global motion vector. Then, the image correcting unit 140 performs image correction onto the inputted image frame according to the smoothed global motion vector estimated by the smoothing unit 130, so as to generate a stabilized image after vibration-proof processing.

Figure 2:
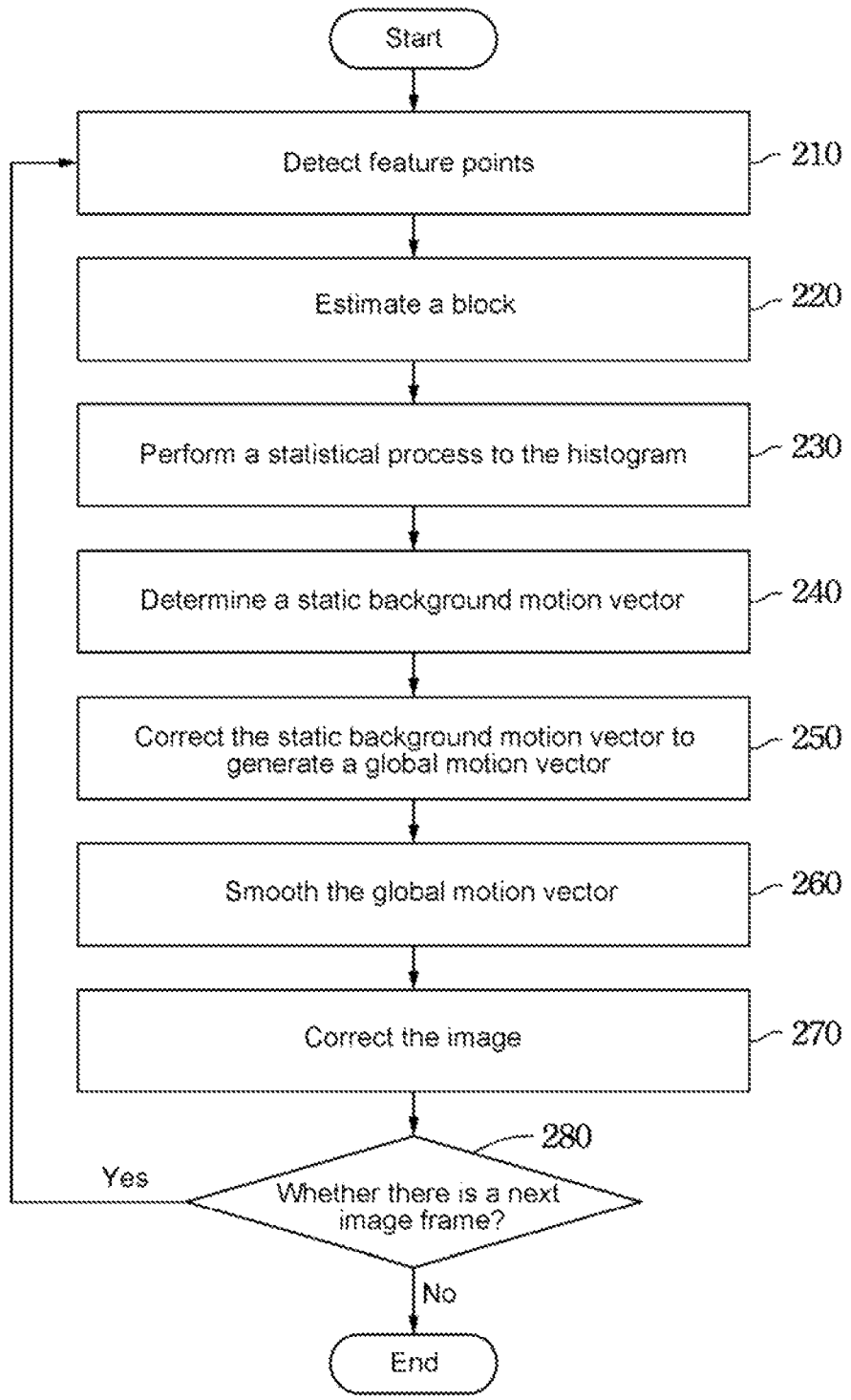
FIG. 2 is a schematic operation flowchart showing a video stabilization method according to one embodiment of the present disclosure.
Figure 3:
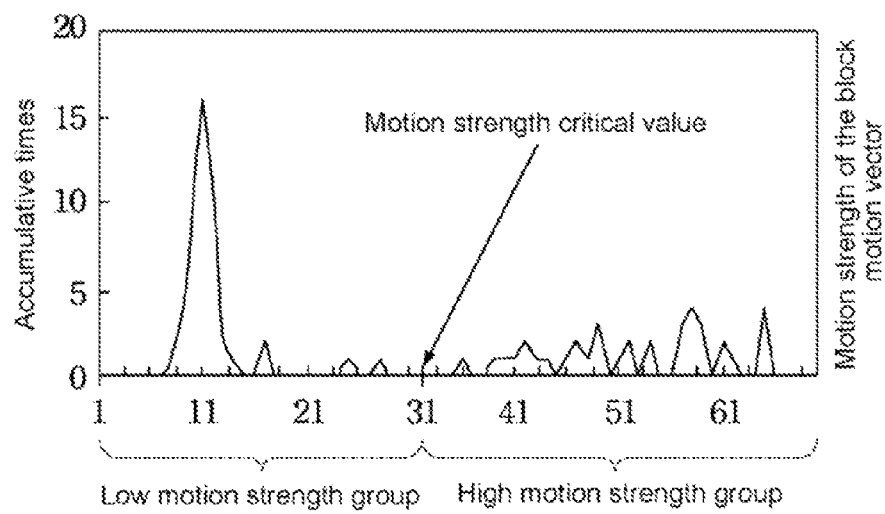
FIG. 3 is a schematic statistical diagram showing a histogram in a video to stabilization method according to one embodiment of the present disclosure.
Figure 4:
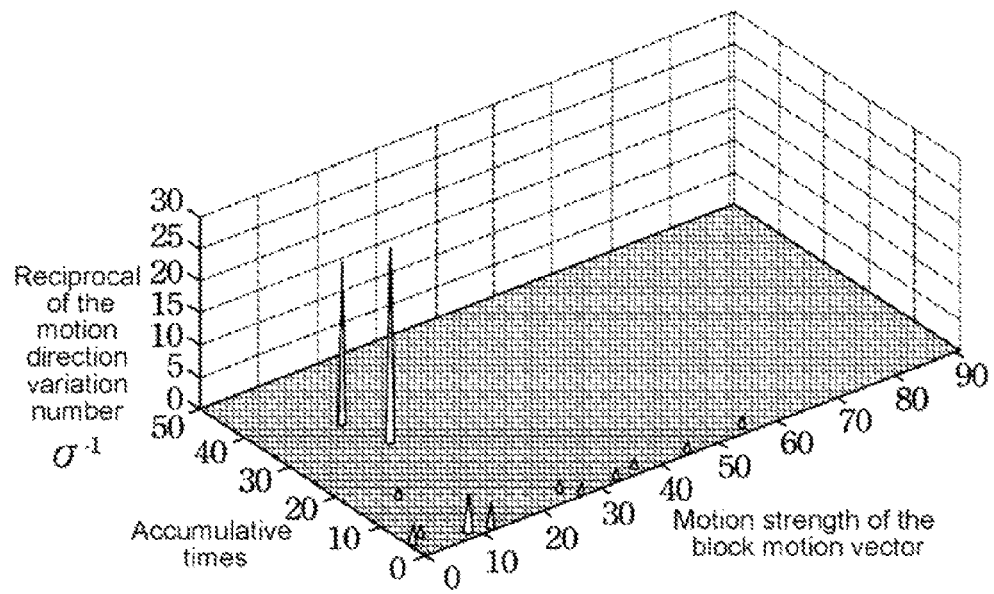
FIG. 4 is a schematic statistical diagram of a reciprocal of a motion direction variance in a video stabilization method according to one embodiment of the present disclosure.
Figure 5:
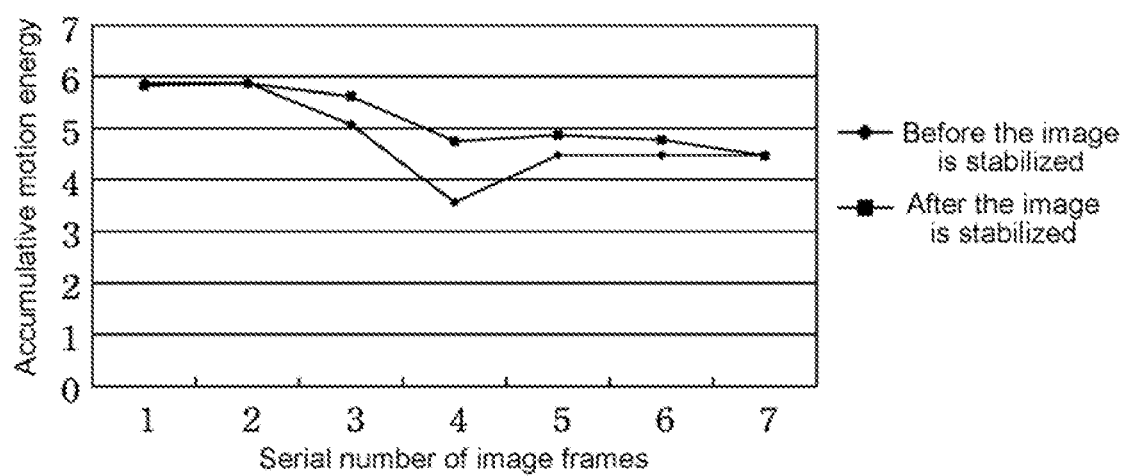
FIG. 5 is a schematic statistical diagram of motion energy of a smoothed inputted image frame in a video stabilization method according to one embodiment of the present disclosure.

FIG. 2 is a schematic operation flowchart showing a video stabilization method according to one embodiment of the present disclosure. Practically, the video stabilization method can be applied to the video stabilization system 100 as shown in FIG. 1 and explained in the following embodiments. Referring to FIG. 3 to FIG. 5 simultaneously, they are a schematic statistical diagram showing a histogram of a video stabilization method, a schematic statistical diagram of a reciprocal of a motion direction variance of a video stabilization method and a schematic statistical diagram of motion energy of a smoothed inputted image frame of a video stabilization method according to one embodiment of the present disclosure. The video stabilization method comprises the following steps. In step 210, a plurality of feature points of an inputted image frame is detected. Then, in step 220, a block motion estimation is performed onto the inputted image frame according to the feature points to generate a plurality of block motion vectors corresponding to the feature points. In this embodiment, a Block matching manner is adopted to perform the block motion estimation onto the inputted image frame for obtaining motion vectors of the block image by performing block comparison between adjacent image frames.

Thereafter, the block motion vectors are converted to a histogram to perform a statistical process in step 230. Then, an initial static background motion vector is determined according to a statistic value of the histogram in step 240. In this embodiment, the step 240 of determining the initial static background motion vector comprises: dividing the histogram into two groups through a two-valued approach, as shown in FIG. 3.

For example, the histogram is divided into a low motion strength block group and a high motion strength block group according to a motion strength critical value "31". Then the motion direction variances of the intervals with the highest accumulative times from the two block groups are calculated (for example, the motion strength "11" and the motion strength "58" are the motion strength intervals with the highest accumulative times in the low motion strength group and the high motion strength group respectively). Then, one of the intervals with the smaller motion direction variance is selected as motion strength of the initial static background motion vector.

As the interval of the motion strength 11 has a reciprocal "30" of a larger motion direction variance as shown in FIG. 4, and thus the motion strength "11" may be used as the motion strength of the initial static background motion vector.

Then, a Gaussian distribution model and a Maximum a Posteriori (MAP) estimation are used to correct the initial static background motion vector to generate a global motion vector in step 250.

In the embodiment, the global motion vector is calculated by using the motion strength of intervals around the initial static background motion vector as correction reference, such as, intervals of motion strength "9", "10", "12" and "13" may be all used as reference values for correcting the initial static background motion vector.

In one embodiment of the present disclosure, the Gaussian distribution model is used to decide whether motion directions of the block motion vectors corresponding to specific intervals of the histogram conform to a Gaussian distribution probability to correct the initial static background motion vector, and the Gaussian distribution model is represented by the following formula:

$$\rho = N(\theta_i | \overline{\theta}_i, 0)$$

where $\rho$ is a probability of the block motion vectors conforming to Gaussian distribution; N is the Gaussian distribution; $\theta_i$ is motion directions of the block motion vectors in the $i^{th}$ correction; and $\overline{\theta}_i$ is an average value of the motion directions of the block motion vectors in the $i^{th}$ correction.

In one embodiment of the present disclosure, the Maximum a Posteriori (MAP) estimation is to correct the initial static background motion vector according to the block motion vectors corresponding to intervals around the initial static background motion vector in the histogram, and the Maximum a Posteriori (MAP) estimation is represented by the following formula:

$$\omega' = (1-\alpha)\omega + \alpha x$$

where $\omega'$ is a new numerical value of the motion vector; $\alpha$ is a coefficient; $\omega$ is an old numerical value of the motion vector; and x is a Posteriori probability.

In one embodiment of the present disclosure, the coefficient $\alpha$ is defined as a reciprocal $\sigma^{-1}$ of the motion direction variance, and the Posteriori probability x is defined as motion vectors including motion strength and motion directions, and the global motion vector is represented by the following formulas after the correction:

$$S_i = (1-\sigma^{-1})S_{i-1} + \sigma^{-1}\overline{I}_i$$

$$A_i = (1-\sigma^{-1})A_{i-1} + \sigma^{-1}\overline{\theta}_i$$

$$i = \{I_0+1, I_0-1, I_0+2, I_0-2, \ldots\}$$

where $S_i$ is motion strength of the global motion vector after the correction (for example, the global motion vector is corrected from the original motion strength 11 to motion strength 12); $A_i$ is a motion direction of the global motion vector after the correction, i is an index value of the intervals in the histogram; $\sigma^{-1}$ is the reciprocal of the motion direction variance; $\overline{I}_i$ is an average value of motion strength of the global motion vector in the $i^{th}$ correction; and $\overline{\theta}_i$ is an average value of motion directions of the global motion vector in the $i^{th}$ correction.

In one embodiment of the present disclosure, the global motion vector is further represented by the following formulas:

$$MVx = \cos(A_i) \cdot S_i$$

$$MVy = \sin(A_i) \cdot S_i$$

where MVx is an x-axis global motion vector, and MVy is a y-axis global motion vector.

In one embodiment of the present disclosure, the global motion vector corresponds to motion energy, and the motion energy is represented by the following formulas:

$$E = \int (E_{continue} + E_{curve}) dt$$

$$E_{continue} = \left\| \frac{dc(t)}{dt} \right\| = \|p_j - p_{j-1}\|^2$$

$$E_{curve} = \left\| \frac{d^2 c(t)}{dt^2} \right\| = \|(p_{j+1} - p_j) - (p_j - p_{j-1})\|^2$$

$$P_j = (MVx, MVy)$$

where E is the motion energy; $E_{continue}$ is continuous energy, $E_{curve}$ is curve energy; $P_j$ is the accumulative global motion vector of $j^{th}$ image frame; MVx is an x-axis global motion vector; and MVy is a y-axis global motion vector.

Thereafter, a smoothing process is performed onto the global motion vector to generate a smoothed global motion vector in step 260. In the embodiment, motion energy of continuous image frames adjacent to the inputted image frame is used as a weighted value for calculating the smoothed global motion vector.

In one embodiment of the present disclosure, the smoothed global motion vector is represented by the following formula:

$$SG = \left( \sum_{j=-1\ldots-3} G'_j \cdot |E'_j| + \sum_{j=0\ldots2} G_j \cdot |E_j| \right) \Big/ \left( \sum_{j=-1\ldots-3} |E'_j| + \sum_{j=0\ldots2} |E_j| \right)$$

where $G'_j$ is the smoothed global motion vector in the $j^{th}$ image frame; $G_j$ is the original global motion vector in the $j^{th}$ image frame; $E'_j$ is the smoothed motion energy in the $j^{th}$ image frame; and $E_j$ is the original motion energy in the $j^{th}$ image frame.

Next, the inputted image frame may be corrected according to the output of the smoothed global motion vector to generate a stabilized image in step 270.

Referring to FIG. 5, the respective accumulative motion energy of respective image frames 3 to 5 may be "5.1", "3.5" and "4.5" before the images are stabilized. The accumulative motion energy of respective image frames 3 to 5 may be "5.6", "4.8" and "4.9" after the images are corrected through the smoothed global motion vector. Hence, closer accumulative motion energy is obtained after continuous image frames are smoothed so as to overcome the image vibration phenomenon.

Thereafter, step 280 is performed to decide whether there is a next image frame. If so, the method returns to step 210 to perform detection of feature points of the next image frame.

In comparison with the prior art, in the embodiments of the present disclosure, the computation quantity of image processing may be reduced via the block motion estimation of the feature points, and the static background motion vector is determined via the statistical process of the histogram, then the global motion vector is corrected via the mathematical model, and the global motion vector is smoothed to overcome image vibration, so that the present disclosure is applicable to image vibration-proof processing for large objects and complex pictures.

Unless the sequence of steps mentioned in the present disclosure is illustrated particularly, the steps and the substeps thereof may adjust the sequence as required practically, and even may be executed simultaneously or partially simultaneously, and the present disclosure is not limited to the foregoing sequence.

Although the present disclosure is disclosed with reference to implementation manners above, the implementation manners are not intended to limit the present disclosure. Various variations and modifications can be made by persons skilled in the art without departing from the spirit and the scope of the present disclosure, so the protection scope of the present disclosure should be subject to what is defined in appended claims.

What is claimed is:

1. A video stabilization system, comprising:
   a block motion estimation unit for detecting a plurality of feature points of an inputted image frame and performing a block motion estimation to the inputted image frame by using the feature points as reference points, thereby generating a plurality of block motion vectors corresponding to the feature points;
   a global motion estimation unit which is electrically coupled to the block motion estimation unit for performing a histogram statistic onto the block motion vectors so as to determine an initial static background motion vector, and for correcting the initial static background motion vector by adopting a Gaussian distribution model and a Maximum a Posteriori (MAP) estimation to generate a global motion vector; and
   a smoothing unit which is electrically coupled to the global motion estimation unit for performing a smoothing process onto the global motion vector to generate a smoothed global motion vector.

2. The video stabilization system of claim 1, further comprising:
   an image correcting unit which is electrically coupled to the smoothing unit for performing image correcting onto the inputted image frame according to the smoothed global motion vector, thereby generating a stabilized image.

3. A video stabilization method, comprising:
   detecting a plurality of feature points of an inputted image frame;
   performing a block motion estimation onto the inputted image frame according to the feature points, thereby generating a plurality of block motion vectors corresponding to the feature points;
   converting the block motion vectors to a histogram to perform a statistical process;
   determining an initial static background motion vector according to a statistic value of the histogram;
   correcting the initial static background motion vector by adopting a Gaussian distribution model and a Maximum a Posteriori (MAP) estimation, thereby generating a global motion vector; and
   performing a smoothing process onto the global motion vector to generate a smoothed global motion vector.

4. The video stabilization method of claim 3, wherein the step of determining the initial static background motion vector comprises:
   dividing the histogram into two groups through a two-valued approach;
   selecting two intervals with the highest accumulative times of motion strength of the block motion vectors from the groups;
   calculating motion direction variances of the intervals; and
   selecting one of the intervals with a smaller motion direction variance as motion strength of the initial static background motion vector.

5. The video stabilization method of claim 4, wherein the two-valued approach is used to divide the block motion vectors into a low motion strength group and a high motion strength group according to a motion strength critical value.

6. The video stabilization method of claim 3, wherein the Gaussian distribution model is used to decide whether motion directions of the block motion vectors corresponding to specific intervals of the histogram conform to a Gaussian distribution probability so as to correct the initial static background motion vector, and the Gaussian distribution model is represented by the following formula:

$$\rho = N(\theta_i | \overline{\theta}_i, 0)$$

wherein $\rho$ is a probability of the block motion vectors conforming to a Gaussian distribution; N is the Gaussian distribution; $\theta_i$ is motion directions of the block motion vectors in the $i^{th}$ correction; and $\overline{\theta}_i$ is an average value of the motion directions of the block motion vectors in the $i^{th}$ correction.

7. The video stabilization method of claim 3, wherein the Maximum a Posteriori (MAP) estimation is used to correct the initial static background motion vector according to the block motion vectors corresponding to intervals around the initial static background motion vector in the histogram, and the Maximum a Posteriori (MAP) estimation is represented by the following formula:

$$\omega' = (1-\alpha)\omega + \alpha x$$

wherein $\omega'$ is a new value of the motion vector; $\alpha$ is a coefficient; $\omega$ is an old value of the motion vector; and x is a Posteriori probability.

8. The video stabilization method of claim 7, wherein the coefficient $\alpha$ is defined as a reciprocal $\sigma^{-1}$ of the motion direction variance, and the Posteriori probability x is defined as motion vectors including motion strength and motion directions, and the global motion vector after correction is represented by the following formulas:

$$S_j = (1-\sigma^{-1})S_{i-1} + \sigma^{-1}\overline{I}_i;$$

$$A_j = (1-\sigma^{-1})A_{i-1} + \sigma^{-1}\overline{\theta}_i;$$

$$i = \{I_0+1, I_0+2, I-2, \ldots\}$$

wherein $S_i$ is motion strength of the global motion vector after the correction; $A_i$ is a motion direction of the global motion vector after the correction; i is an index value of the intervals in the histogram; $\sigma^{-1}$ is the reciprocal of the motion direction variance; $\overline{I}_i$ is an average value of motion strength of the global motion vector in the $i^{th}$ correction; and $\overline{\theta}_i$ is an average value of motion directions of the global motion vector in the $i^{th}$ correction.

9. The video stabilization method of claim 8, wherein the global motion vector corresponds to motion energy, and the motion energy is represented by the following formulas:

$$E = \int (E_{continue} + E_{curve}) dt$$

$$E_{continue} = \left\|\frac{dc(t)}{dt}\right\| = \|p_j - p_{j-1}\|^2$$

$$E_{curve} = \left\|\frac{d^2 c(t)}{dt^2}\right\| = \|(p_{j+1} - p_j) - (p_j - p_{j-1})\|^2$$

$$P_j = (MVx, MVy)$$

wherein E is the motion energy; $E_{continue}$ is continuous energy; $E_{curve}$ is curve energy; $P_j$ is the accumulative global motion vector of a $j^{th}$ image frame; MVx is an x-axis global motion vector; and MVy is a y-axis global motion vector.

10. The video stabilization method of claim 9, wherein the smoothed global motion vector is represented by the following formula:

$$SG = \left(\sum_{j=-1\ldots-3} G'_j \cdot |E'_j| + \sum_{j=0\ldots 2} G_j \cdot |E_j|\right) \bigg/ \left(\sum_{j=-1\ldots-3} |E'_j| + \sum_{j=0\ldots 2} |E_j|\right)$$

wherein $G_j'$ is the smoothed global motion vector in the $j^{th}$ image frame; $G_j$ is the original global motion vector in the $j^{th}$ image frame; $E_j'$ is the smoothed motion energy in the $j^{th}$ image frame; and $E_j$ is the original motion energy in the $j^{th}$ image frame.

* * * * *